Sept. 4, 1956     W. J. GILBERT, SR     2,761,709
ROTARY SHAFT SEAL
Filed April 3, 1953     2 Sheets-Sheet 1
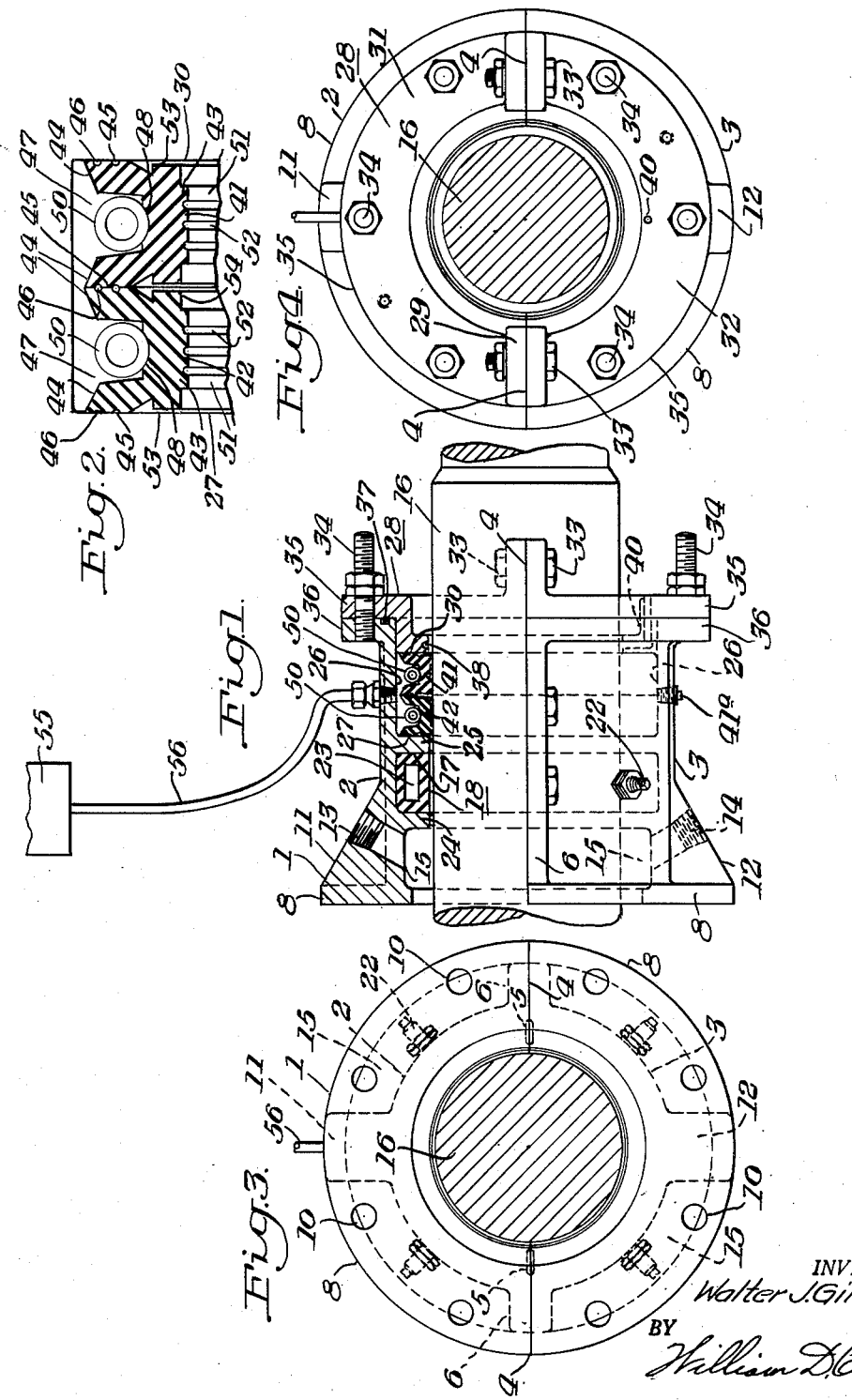
INVENTOR.
Walter J. Gilbert, Sr.
BY
William D. Carothers
HIS ATTORNEY.

Sept. 4, 1956  W. J. GILBERT, SR  2,761,709
ROTARY SHAFT SEAL
Filed April 3, 1953  2 Sheets-Sheet 2
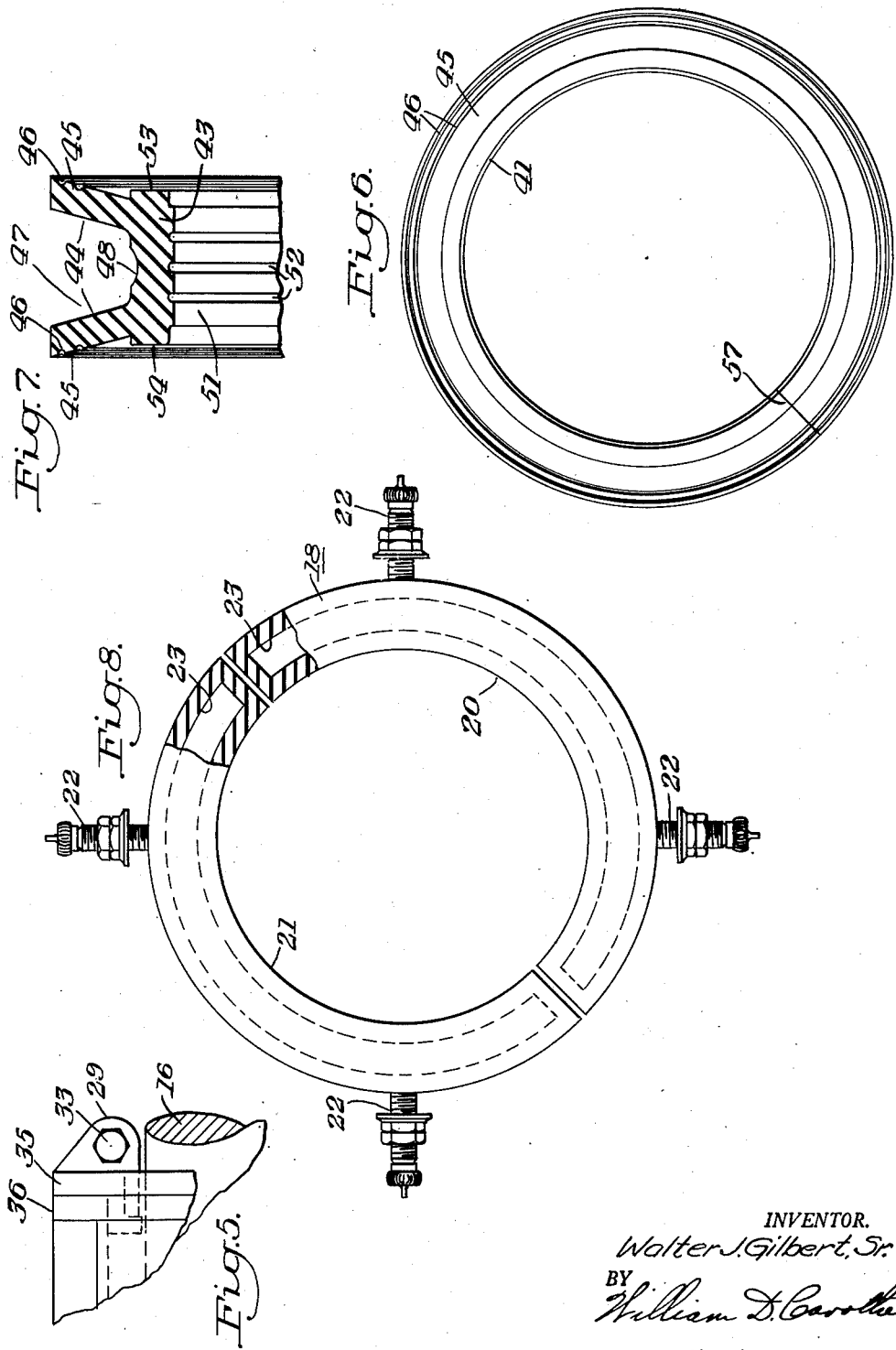
INVENTOR.
Walter J. Gilbert, Sr.
BY
HIS ATTORNEY.

United States Patent Office 2,761,709
Patented Sept. 4, 1956

2,761,709

ROTARY SHAFT SEAL

Walter J. Gilbert, Sr., Indiana, Pa., assignor to Syntron Company, Homer City, Pa., a corporation of Delaware Application April 3, 1953, Serial No. 346,737

6 Claims. (Cl. 286—9)

This invention relates generally to seals and more particularly to shaft seals for shafts such as propeller shafts on ships.

Propeller shafts on ships extend through a packing chamber forming a stuffing box wherein the packing material is jammed into the stuffing box chamber around the shaft and pressure is applied by an adjustable gland member. These shafts also shift longitudinally. When this seal fails, it is necessary to put the ship in dry dock to repair and replace the material in the stuffing box that forms the seal. When a considerable amount of pressure has been required on the packing material by the gland member to make the seal function, these pressures increase the friction, and the shaft will become heated and become galled. The galled and rough shaft then wears out new packing requiring frequent renewal, because the shaft must be kept smooth and cylindrical in order to properly seal with the packing forced into contact by the gland. In order to avoid these difficulties, removable seal collars are employed on the propeller shafts. These must be long enough to compensate for the longitudinal movement of the shaft. This necessitates the replacement of the seal collar rather than the shaft, but the source of the trouble remains, namely a scoring of the surface engaging the packing and the subsequent roughening of the same.

The seal comprising this invention overcomes these disadvantages by rotating with the shaft, thus eliminating entirely any wear on the shaft. This invention also contemplates the use of a split housing and a transversely cut seal adapted to be placed over a propeller shaft and in sealed relation to the ship. This housing also contains a standby shaft seal and a separate housing for the independent shaft seal that comprises an important part of this invention. The standby and the independent shaft seals are split so that they may be assembled on a shaft while in service. The split housing, together with the split seals, namely, the standby seal and the independent shaft seal, may be mounted on the propeller shaft when the boat is at sea; thus avoiding the expense of dry docking the ship to replace these seals.

The independent shaft seals are in split ring form. The bore of the body of the ring is provided with a labyrinth grooved surface that embraces the propeller shaft causing the seal to rotate therewith and diverging flanges extend from the sides of the body of the ring seal and have surfaces which engage the side walls of the seal chamber. The sides of the body of the seal have abutments and when the shaft shifts longitudinally, these abutments engage each other on the side wall. Ordinarily they do not engage or otherwise contact each other or the walls of the seal chamber. These abutments prevent the flanges on the seal from becoming flexed beyond the point that they cease from becoming effective as a seal.

The problems solved by this invention are to enable a propeller shaft seal to be changed when the ship is at sea and to provide a seal that does not score the propeller shaft by reason of its use and to provide a seal that prevents the flange sealing surfaces to be flexed beyond their normal operating position due to the longitudinal movement of the shaft. These three problems are ordinarily not found in fields of sealing a rotary or a reciprocating shaft. This accounts for the fact that the seal comprising this invention is an improvement over the rotary shaft seals of patents such as 2,547,185 and 2,561,694, since the structures of these patents could not solve these problems.

The principal object of this invention is the provision of means for sealing a shaft such as the propeller shaft of a vessel, which is subject to limited longitudinal movement and which will maintain a seal on the shaft without wearing the surface of the same. The seal of this invention eliminates the use of the packing gland type of seal and requires no relative rotary movement between the seal member and the shaft, thereby eliminating the wearing factor but permits longitudinal movement.

Another object of this invention is the provision of a seal that may be readily replaced on the propeller shaft of a ship while at sea.

Another object of this invention is the provision of a seal for a propeller shaft of a ship that employs fluid under pressure to withstand the pressure of the sea and lubricate the same time it seals the propeller shaft where it passes through the hull or through bulk heads in the ship.

Other objects of this invention appear hereinafter in the following description and claims.

The accompanying drawings show for the purpose of exemplification without limiting the invention or claims thereto certain practical embodiments of the invention wherein:

Fig. 1 is a longitudinal sectional view showing the seal as applied to a propeller shaft of a ship.

Fig. 2 is an enlarged view of the seal structure as illustrated in Fig. 1.

Fig. 3 is a view of the left end of the structure as illustrated in Fig. 1.

Fig. 4 is a view of the right end of the structure as illustrated in Fig. 1.

Fig. 5 is a detailed view illustrating a portion of the split housing construction as employed with a seal comprising this invention.

Fig. 6 is a view in side elevation of the seal comprising this invention when a free body.

Fig. 7 is a view in cross section of the seal comprising this invention when a free body.

Fig. 8 is an end view of a temporary standby seal employed to seal the propeller shaft when the principal seal is being replaced.

Referring to the drawings, and particularly to the structure as shown in Figs. 1 to 4 inclusive, the split housing 1 is made in two halves 2 and 3 being split along the horizontal plane as indicated at 4 and which are locked together by the key members 5 which are positioned on opposite sides of the bore of the split housing and within the faces of the radial flange 6 which when bolted together form a complete housing.

The end of the housing as viewed at the left in Fig. 1 and as shown in Fig. 3 is provided with an annular flange member 8 and has a series of holes 10 passing therethrough for securing the same to the hull of the ship or to the bulkhead depending upon where the seal is placed on the ship. This flange 8 is backed up by the upper and lower angular brace members 11 and 12 which are also provided with the threaded openings 13 and 14 that open into the interior chamber 15 of the split housing surrounding the propeller shaft 16. The upper threaded opening 13 may be connected to the salt water pumping system of the vessel as a discharge and the lower threaded opening 14 may be employed as a drain or flowout of the chamber 15 surrounding the propeller shaft.

The halves of the split housing 1 form a second annular chamber 17 for receiving the split standby sealing member 18 which is shown in Fig. 8 and is provided with two halves 20 and 21, which are entirely independent of each other and each are provided with two valve members 22 which support the split standby seal within the annular chamber 17. The nuts on the valve members 22 hold the split sections of the standby seal with their inner arcuate surfaces in spaced relation to the propeller shaft 16. Each of the standby seals are provided with an interior passage 23 for receiving fluid under pressure such as water, oil, gas or air that may be inserted through the valve stems 22 to expand the seal members into sealing relation with the annular chamber 17 and with each other where the ends of the seal members abut one another and also in sealing relation on the propeller shaft 16. Here the shaft rotates in contact with the seal. It will be noted that the wall thickness of the standby seal is substantially uniform on all sides. This permits the seal to properly expand and seal against the propeller shaft. It will also be noticed that the inner arcuate surface of the seal has substantially square corners which expand to seal the adjacent clearances formed between the propeller shaft 16 and the partition walls 24 and 25 that form the boundary of the annular chamber 17.

On the other side of the partition wall 25 the third annular chamber 26 is open through to the end of the split housing 1 forming an annular bore of diameter substantially similar to that of the diameter of the annular chamber 17. This bore 26 is provided with a substantially radial wall 27 on the face of the partition wall 25. This chamber is closed at its end by the gland member 28, which also presents the radial boundary wall 30 for the annular chamber 26. The gland member 28 is also formed into sections as illustrated at 31 and 32 which are bolted together by the bolts as indicated at 33 and is bolted to the split housing by means of the stud bolts 34. The gland member is provided with the outwardly extending radial flange 35 to receive and mate with the flange 36 on the housing and to which the stud bolts 34 are secured. An annular seal member 37 is provided between the adjacent surfaces of the flanges 35 and 36 to seal the chamber 26 in the housing.

An annular groove 38 is placed on the inner edge of the flange of the inwardly directed flange of the gland member 27 and is for the purpose of catching any sealing fluid that may leak past the seal members, which fluid is subsequently carried by the passage 40 to the bottom of the exterior of the split housing and the gland member as indicated in Fig. 1. A plug 41 is also provided at the bottom of the chamber 26 for draining the fluid from chamber 26. Any leakage that may seep from the chamber 26 is caught by the annular groove 38 and directed to the passageway 40 where it may be caught in a container placed underneath the split housing.

The annular seal members comprising the principal feature of this invention are illustrated at 41 and 42. Each of these seal members are alike and are illustrated in Figs. 6 and 7 as a free body. This seal member is provided with a body section 43 that has outwardly projecting flanges 44, the outer faces 45 of which form the sealing surfaces of the annular seal member. These faces are provided with the grooves as indicated at 46 in the sealing faces. These flanges 44 are diverged from one another and provide a V-shaped groove 47 therebetween. The bottom of the groove 47 is provided with an annular groove 48 that is arcuate in cross section for receiving a spring or fastening means such as indicated at 50 in Figs. 1 and 2. This is merely a helical spring having its ends hooked together and when it lies in the groove 48 around the seal, it holds the bore 51 tightly against the surface of the propeller shaft 16. The bore 51 of each seal is provided with a series of labyrinth grooves such as indicated at 52 which may be adjusted to permit a small leakage of fluid therethrough as a lubricant depending upon the pressure which the spring members 50 exert on the seal.

The seal member is provided with abutments 53 and 54 at the sides of the body 43. These abutments extend beyond the base of the flanges 44, but they do not extend beyond the outer perimetral edge of the sealing surfaces 45 on these flanges 44. The abutments are normally not in contact with each other or with the walls of the chamber when the seal members are mounted in position as illustrated in Figs. 1 and 2, they are spaced slightly from each other. Thus, when the shaft 16 is moved longitudinally in one direction, the flanges 44 are permitted to flex somewhat until the abutments 53 and 54 engage the abutment of the adjacent sealing ring or engage the walls 27 or 30 of the sealing chamber 26 as the case may be. If the abutments 53 and 54 engage the radial walls 27 or 30 or the abutment of the adjacent ring, they limit any further movement of the ring with the shaft 16 and require the seal ring to slide over the surface of the shaft while the shaft continues in its direction of movement. This provides relative longitudinal movement between the rubber seal ring and the shaft which occurs only in extreme conditions where the propeller shaft is required to move a predetermined amount longitudinally, and the adjacent abutments engage each other or the adjacent walls of the chamber in which the sealing rings are mounted to prevent the flexible flanges 44 of a seal member from flexing beyond a predetermined position which would have a tendency to cause their sealing faces to permit leakage. Thus the abutments 53 and 54 guard against over flexure of the flexible flanges 44 that would have a tendency to cause the sealing faces to permit leakage between the rotary shaft 16 and the radial walls 27 and 30 that enclose the chamber 26. When the abutments engage each other and one end wall of the chamber, the opposite wall is still properly sealed.

As illustrated in Figs. 1 and 2, the adjacent sealing rings have their adjacent flange faces in engagement. Thus, the sealing face of the flange of one sealing ring engages the sealing face of the flange of the adjacent sealing ring. However, there is ordinarily no rotary motion between these surfaces and a seal effected therebetween. Since the sea water or other fluid being sealed is apt to seep through into the chamber 15, past the chamber 17, and presents itself to the chamber 26, a sealing fluid under pressure is supplied through the supply tank 55 and the tubular passage 56 to the chamber 26 wherein the fluid expands the flanges tightly against each other and tightly against the radial walls defining the ends of the chamber 26.

As shown in Fig. 4, the bolts 33 that fasten the halves of the gland members 28 together extend inwardly to the inner radial flange as illustrated in Fig. 5, thus supporting this inturned flange adjacent the inner edge thereof.

As shown in Fig. 6, the annular sealing ring 41 is slit as indicated at 57 so that it may be assembled around the shaft 16 without removing the shaft. Thus when the assembling or replacing any of the sealing members within the chamber 26, the expansible standby seals 20 and 21 are expanded by fluid under pressure and caused to seal on the shaft, regardless of whether it rotates or not. This seals off the flow or the passage of the fluid to the chamber 26 and permits the gland member 28 to be removed, and the annular sealing members 41 and 42 to be replaced.

This type of seal prevents any scoring or other marring of the shaft itself, and the annular radial surfaces 27 and 30 are readily cooled and do not wear but may be reformed or replaced by replacing the sections of the casting which is materially less expensive than dry docking a ship or placing an enlarged sleeve over the propeller shaft where the packing has scored and ruined the surface of the same.

The standby seal may function to permit the ship to continue in its operations while replacing the principal or other seal. This prevents the loss of any time at sea, and such a structure permits the seals to be changed on the propeller shafts or on any other shafts that are extending through and sealing the hull of a vessel or in any other fluid shaft. The abutments on the sides of the sealing members prevent the sealing faces on their radial flanges from becoming flexed beyond a predetermined limit that would have a tendency to prevent their properly sealing with the corresponding wall.

I claim:

1. A fluid pressure seal for a rotary shaft projecting out of a body which comprises a longitudinally partible housing having longitudinally disposed mating radial flanges fastened to each other to form a tubular casing to fit over the shaft, an arcuate flange on each part of said housing to form an annual flange on one end of said casing to mount the same in sealed relation with the body around said shaft, an outwardly open annular chamber in said casing, a radial wall at the inner end of said chamber, a split gland member closing the outer end of said chamber and providing a second radial wall for said chamber, annular flexible seal means having flanged sides and formed of a transversely cut ring means surrounding the shaft and disposed in said chamber with the sides thereof sealing on said radial walls of said chamber, and a resilient garter means surrounding said flexible seal means having its ends secured together to form an endless clamp on said flexible seal means making it grip and seal on said shaft and maintain the transverse cut in tight sealing relation.

2. The structure of claim 1 characterized in that said seal means comprises two transversely cut ring seal means each having marginal flanges and a resilient garter means, adjacent flanges sealing with each other and the outer flanges sealing with said radial walls.

3. The structure of claim 1 which also includes a pipe line to conduct clean liquid to said chamber to lubricate between said seal means and said radial walls.

4. A fluid pressure seal for a rotary shaft having limited longitudinal movement comprising an integral annular elastomer seal means having a cylindrical body, an annular seal surface in the bore of said body spaced from the ends thereof to engage the shaft, spaced diverging flexible annular flanges extending from the perimetral surface of said body, the outer faces of said flanges provide sealing surfaces which extend beyond the ends of said body when said elastomer seal is free, said elastomer seal means being slit transversely forming abutting ends, and an annular spring extending around said body to hold the same in sealed relation on the shaft, said annular spring spaced from said flanges.

5. The structure of claim 4 which also includes a housing fitting over said shaft and having an annular chamber with spaced radial walls engaged by said flexible annular flanges, and fluid pressure supply means to direct and maintain fluid under pressure to said annular chamber to force said flexible annular flanges into sealing engagement with said radial walls.

6. The structure of claim 4 which also includes a housing fitting over said shaft and having an annular chamber with spaced radial walls engaged by the flexible flanges of said elastomer seal means, one of said radial walls being removable from said housing, said elastomer seal means being in the form of two duplicate ring-shaped bodies with their adjacent flexible flanges engaging each other, and their outer flanges engaging the walls of said chamber.

References Cited in the file of this patent

UNITED STATES PATENTS

| | | |
|---|---|---|
| 1,776,911 | Jones | Sept. 30, 1930 |
| 2,155,628 | Williams | Apr. 25, 1939 |
| 2,191,265 | Wheeler | Feb. 20, 1940 |
| 2,387,182 | Proctor | Oct. 16, 1945 |
| 2,538,683 | Guiler et al. | Jan. 16, 1951 |

FOREIGN PATENTS

| | | |
|---|---|---|
| 858,175 | Germany | Dec. 4, 1952 |
| 936,483 | France | Feb. 16, 1948 |